United States Patent
Farwell et al.

(10) Patent No.: US 9,438,636 B2
(45) Date of Patent: Sep. 6, 2016

(54) METHOD TO BLOCK SPLIT PHONE AND GATEWAY REGISTRATION

(75) Inventors: Charles Farwell, Denver, CO (US); Don Gillespie, Boudler, CO (US); Cliff Grimes, Morrison, CO (US); Scott Hendrick, Broomfield, CO (US); Won Huh, Broomfield, CO (US); Tim Kaye, Lakewood, CO (US); Robert Mitchell, Aberdeen, NJ (US); Ted Morrow, Golden, CO (US); Tamara Jo Noirot, Louisville, CO (US); Nancy Schmidt, Broomfield, CO (US); Rick Windhausen, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 918 days.

(21) Appl. No.: 12/560,144

(22) Filed: Sep. 15, 2009

(65) Prior Publication Data
US 2010/0278039 A1 Nov. 4, 2010

Related U.S. Application Data

(60) Provisional application No. 61/174,870, filed on May 1, 2009.

(51) Int. Cl.
*H04L 12/66* (2006.01)
*H04L 29/06* (2006.01)

(52) U.S. Cl.
CPC ........... *H04L 65/1043* (2013.01); *H04L 12/66* (2013.01); *H04L 65/1046* (2013.01); *H04L 65/1073* (2013.01)

(58) Field of Classification Search
USPC .......................... 370/221, 216, 218
See application file for complete search history.

(56) References Cited

U.S. PATENT DOCUMENTS

| | | | | |
|---|---|---|---|---|
| 5,949,753 | A * | 9/1999 | Alexander et al. | 370/216 |
| 6,108,300 | A * | 8/2000 | Coile et al. | 370/217 |
| 6,374,302 | B1 * | 4/2002 | Galasso et al. | 709/238 |
| 6,400,950 | B1 | 6/2002 | Patel et al. | |
| 6,785,223 | B1 * | 8/2004 | Korpi et al. | 370/218 |
| 2003/0167343 | A1 * | 9/2003 | Furuno | 709/244 |
| 2003/0179763 | A1 | 9/2003 | Horiba | |
| 2005/0058061 | A1 * | 3/2005 | Shaffer et al. | 370/216 |
| 2006/0245419 | A1 | 11/2006 | Nag et al. | |

FOREIGN PATENT DOCUMENTS

| | | |
|---|---|---|
| JP | H11-284667 | 10/1999 |
| JP | 2003-258837 | 9/2003 |
| JP | 2005-020610 | 1/2005 |
| WO | WO 02/098104 | 12/2002 |

OTHER PUBLICATIONS

Extended European Search Report for European Patent Application No. 10161612.6, dated Jul. 15, 2010.
English translation of Official Action for China Patent Application No. 201010170404.7, dated Nov. 24, 2011 10 pages.

(Continued)

*Primary Examiner* — Omar Ghowrwal
*Assistant Examiner* — Angel Brockman
(74) *Attorney, Agent, or Firm* — Sheridan Ross P.C.

(57) ABSTRACT

The present disclosure is directed to a method and system to forcibly unregister and/or prevent registration of a gateway and/or other endpoint in a network region in response to a survivable gatekeeper servicing the network region becoming active.

20 Claims, 4 Drawing Sheets

(56) References Cited

OTHER PUBLICATIONS

Official Action with English Translation for China Patent Application No. 201010170404.7, dated Sep. 5, 2012 7 pages.
Official Action with English Translation for Japan Patent Application No. 2010-104819, mailed Aug. 2, 2013 3 pages.
Notice of Allowance with English Translation for China Patent Application No. 201010170404.7, dated May 5, 2014 5 pages.
Official Action with English Translation for Japan Patent Application No. 2010-104819, mailed Feb. 18, 2014 3 pages.
Notice of Allowance and English Translation for Japan Patent Application No. 2010-104819, mailed Feb. 25, 2015 2 pages.

* cited by examiner

METHOD TO BLOCK SPLIT PHONE AND GATEWAY REGISTRATION

CROSS REFERENCE TO RELATED APPLICATION

The present application claims the benefits of U.S. Provisional Application Ser. No. 61/174,870, filed May 1, 2009, entitled "METHOD TO BLOCK SPLIT PHONE AND GATEWAY REGISTRATION", which is incorporated herein by this reference in its entirety.

FIELD

The disclosure relates generally to call admission control and particularly to split registrations resulting from network or equipment malfunctions.

BACKGROUND

A distributed telecommunications network can have multiple components. At a primary or main server, a gatekeeper is responsible for address translation (e.g., translation of H.323 identifiers and E.164 numbers to endpoint IP addresses), call admission control (which controls endpoint admission into the H.323 network), bandwidth control (which manages endpoint bandwidth requirements), and zone management (which involves primarily controlling the endpoint registration process). In a typical distributed network, media gateways positioned in remotely located network regions provide resources (e.g., Digital Signal Processor ("DSP") and trunking resources) to local endpoints. To permit the gatekeeper associated with the primary or main server to maintain control, remotely located gateways and endpoints register with the gatekeeper. A heart beat or keep alive mechanism permits each of the remotely located components to monitor the state of the primary or main server and the connection between the server and the remote component. To provide redundancy, one or more remote network segments are serviced by a remotely located survivable gatekeeper/server. The survivable gatekeeper remains inactive until the primary server and/or connection to it malfunctions or is otherwise not available. In response to an attempted registration by a gateway, the survivable gatekeeper becomes active and attempts to notify the primary server of its changed status.

When a malfunction occurs followed by a recovery, a split registration can result. A split registration refers to a state where some remotely located endpoints are associated with a local gateway, and registered with a survivable gatekeeper, while other remotely located endpoints from the same network region are registered with the gatekeeper in the primary server. Split registration is possible when the duration of the malfunction is longer than the transition point of the gateways but shorter than the transition point of all or some of the endpoints. The transition point refers to the time interval during which the respective component is required to attempt registration only with the primary or main server. After the transition point, the component is free to attempt registration with the respective survivable processor.

During split registration, the endpoints registered with the gatekeeper in the primary or main server do not have access to trunk or gateway resources and would therefore be unable to make calls or contact some other endpoints in the enterprise network. For calls that can be made, the remote endpoints registered with the primary gatekeeper will consume precious bandwidth over the wide area network positioned between the network region and the primary server because the resources needed for the call are located at the primary server 104. This problem can occur even when the primary server 104 has some trunk resources in other regions. As an illustrative example, the endpoints registered with the primary server 104 are unable to use the primary server's trunk resources because location-based routing rules prevent access to these trunk resources.

Recovery from split registration is commonly manual and can take many hours for large systems.

There have been attempts, though of varying degrees of success, to address split registration. In one approach, when a station is registered on a survivable gatekeeper and an inbound call arrives at the primary server for that station, the call is redirected through the Public Switched Telephone Network ("PSTN") to the survivable gatekeeper. This approach applied only to inbound, and not outbound, calls. In another approach, when a station is registered on a survivable gatekeeper and a station-to-station call within the enterprise network arrives at the primary server for that station, the call is redirected through the PSTN to the survivable gatekeeper. This approach is only for station-to-station calls and not for inbound or outbound calls.

There is a need for a method and system to prevent or reduce the likelihood or extent of split registration.

SUMMARY

These and other needs are addressed by the various embodiments and configurations of the present disclosure.

In a first aspect, a method is provided to perform the steps:

(a) determine, by a primary gatekeeper, that a survivable gatekeeper assigned to a selected network region has become active; and (b) in response, at least one of unregistering, from the primary gatekeeper, a gateway and/or voice communications endpoint assigned to the selected network region and preventing further registration, with the primary gatekeeper, of the gateway and/or voice communications endpoint.

In one aspect, a method is provided to disable, at a primary gatekeeper, a network region when it is determined that a survivable gatekeeper in the network region is active (or has successfully registered a component in the network region). The disablement of the network region will cause the primary gatekeeper to unregister or deny registration to components assigned to that network region.

The present disclosure can provide a number of advantages depending on the particular configuration. For example, the disclosure describes a method and system that can prevent or reduce the likelihood or extent of split registration. It can provide a consistent, deterministic, and logical clustering of gateways and endpoints after failures when compared to conventional methods and systems. It can force substantially simultaneous migration, or aggregation, of the components in a network region to a survivable server, followed at an appropriate later time by re-registration of the components with the primary gatekeeper. The approach of the disclosure can operate to prevent split registration by gateways and endpoints.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "network region" refers to a collection of logical and/or physical components, which is typically expressed as a range or list of network addresses. The components may or may not be physically co-located. A network region may or may not contain a media gateway and may or may not have a dedicated survivable gatekeeper or server. In some configurations, a survivable gatekeeper and/or server will service multiple network regions, including multiple media gateways and endpoints.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

Figure 1:
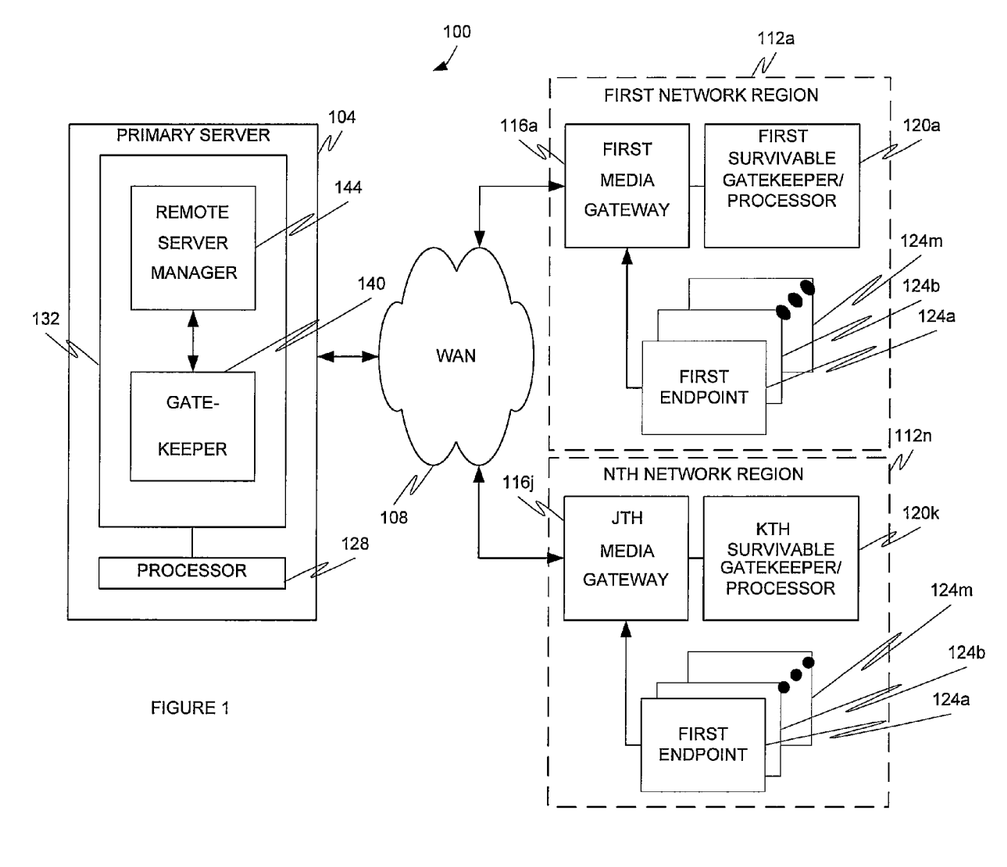
FIG. 1 is a block diagram depicting a system according to an embodiment.

A system according to a first embodiment will be described with reference to FIG. 1. In the figure, a geographically distributed enterprise network 100 includes a primary server 104 in communication, via WAN 108, with first, . . . nth network regions 112a-n. The primary server 104 is normally a software-controlled communications server that can operate as a common platform for a wide range of communications applications. The server 104 can be, for example, a media server, such as the S8300, S8400, S8500, S8730 media servers of Avaya, Inc.™ The WAN 108 is a public or private network, such as the Public Switched Telephone Network ("PSTN"), other network facilities available from public service providers, or network facilities that are within a customer enterprise or leased from a third party.

The network regions 112a-n collectively include first, . . . jth media gateways 116a j, first, . . . kth survivable gatekeepers/processors 120a-k, and first, . . . mth endpoints 124a-m. The first, . . . jth media gateways 116a-j are electronic signal repeaters, interpreters, and/or converters that provide conferencing capabilities, connect to other networks, interwork between communication protocols and multimedia formats, and provide DSP and other resources to serviced endpoints. Each media gateway may have trunk and Voice over IP (DSP) resources. Exemplary media gateways include the G250, G350, G450, G650, G700, and IG550 media gateways of Avaya, Inc.™ The survivable gatekeepers 120a-k, when active, perform address translation (e.g., translation of H.323 identifiers and E.164 numbers to endpoint IP addresses), call admission control (which controls endpoint admission into the H.323 network), bandwidth control (which manages endpoint bandwidth requirements), and zone management (which involves primarily controlling the endpoint registration process). The survivable gatekeeper 120a-k can associate with a media server 104, such as any of those referenced above. The endpoints 124a-m can be any voice communications endpoint, including digital and analog phones and Voice over IP ("VoIP") hardphones and softphones.

The primary server 104 includes a processor 128 and a memory 132, including a gatekeeper 140 and a remote server manager 144. The processor 128 is normally a microprocessor while the memory 132 can be any computer-readable medium. The gatekeeper 140 performs the functions set forth above with respect to the survivable gatekeepers. The remote server manager 144, in response to receipt of a message from a survivable gatekeeper 120 that the gatekeeper has become active, disables the active survivable gatekeeper's network region(s), which forces components assigned to the network region(s), such as media gateways and endpoints, to be unregistered from the primary server 104 and prevents the components from registering with the primary server 104. In other words, disabling the network region(s) forces components assigned to that network region(s) to register with the survivable gatekeeper assigned to that network region(s). At a later time, for reasons such as manual action to release components from the survivable processor, reaching a particular time of day, or failure of the survivable processor, remote server manager 144 again permits components assigned to the network region to register with the primary server 104. In this manner, the incidence of split registrations is substantially inhibited.

As will be appreciated, each media gateway 116 and endpoint 124 in each network region 112 has an alternate gatekeeper list containing a listing of gatekeepers in the order in which the particular component is to attempt registration. When the first (highest) ranked (or primary) gatekeeper is unable to register the component, the component attempts to register with the second (next highest) ranked (or alternative) gatekeeper, and so on. At a selected point known as the transition point, the component, if still unregistered, will attempt to register with the listed survivable gatekeeper 120. If the component is a media gateway 116 and registers successfully with the survivable gatekeeper 120, the survivable gatekeeper 120 becomes active. In response, the survivable gatekeeper 120 notifies the primary gatekeeper 140 that the survivable gatekeeper is now active. The transition point is normally based on passage of time. Media gateways normally require a smaller passage of time to reach their transition points than other endpoints, such as voice communication endpoints (e.g., stations).

Figure 4:
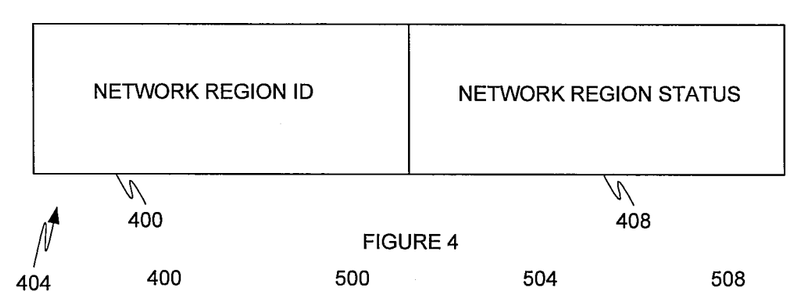
FIG. 4 depicts a first set of data structures according to an embodiment.
Figure 5:
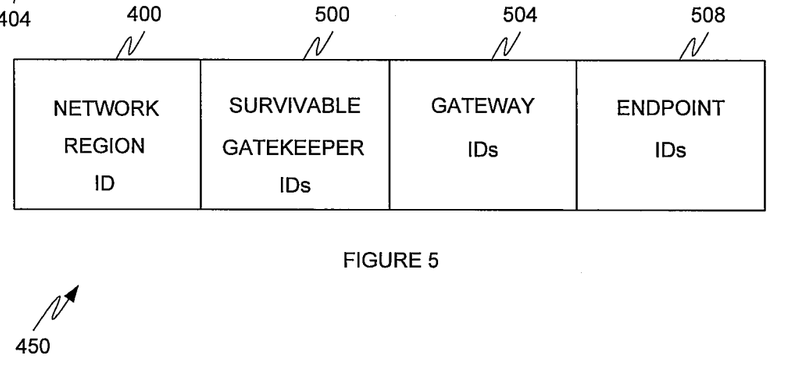
FIG. 5 depicts a second set of data structures according to an embodiment.

Data structures that could be employed by the primary server 104 to effect this anti-split-registration functionality are depicted in FIGS. 4-5. As can be seen from FIG. 4, each network region has a unique network region identifier 400 and a corresponding network region status 408 (enabled or disabled). Referring to FIG. 5, each network region ID 400 has a number of associated component fields, which are shown as being the survivable gatekeeper IDs 500 (the unique ID(s) of one or more survivable gatekeepers assigned to the identified network region), the gateway IDs 504 (the unique ID(s) of one or more media gateways assigned to the identified network region), and the endpoint IDs 508 (the unique ID(s) of one or more endpoints assigned to the identified network region).

Figure 2:
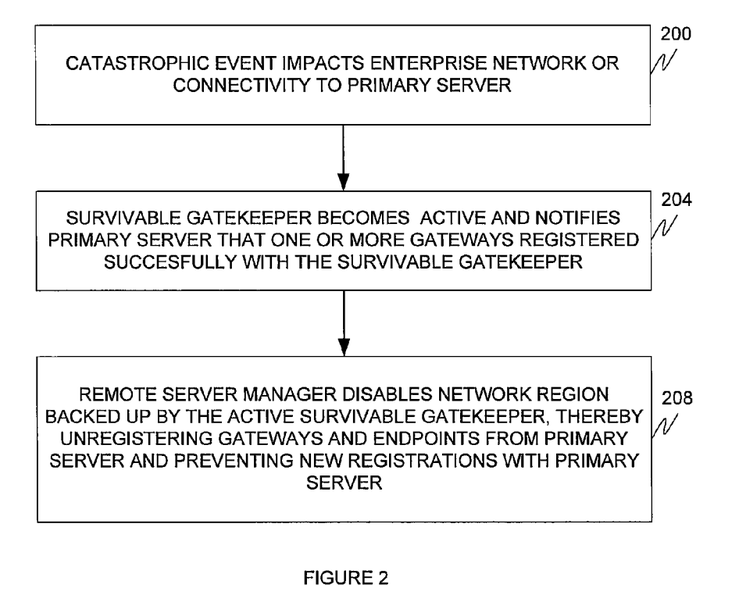
FIG. 2 is a flow chart depicting an operation of the system according to an embodiment.

An operation of the remote server manager 144 will now be discussed with reference to FIG. 2.

In step 200, an event impacts the enterprise network or connectivity to the primary server, which causes a temporary loss of connectivity of the components in one or more network regions 112a-n with the primary server 104. Exemplary events include the primary server failing or resetting, a disruption of connectivity over the WAN, network fragmentation, a router malfunction, and the like.

In step 204, the affected survivable gatekeeper 120 notifies the primary server 104 that it has become active in response to the event and includes, in the notification, an identifier assigned to the gatekeeper 120. As noted, the gatekeeper 120 has become active in response to one or more gateways registering successfully with it. This is an indication that the gateways have passed the transition point without a successful registration with the primary server 104. It is a further indication that some endpoints in the affected network region, which have later transition points, will soon be attempting to register with the survivable gatekeeper due to unsuccessful registration with the primary server or an alternate (primary) gatekeeper.

In step 208, the remote server manager, in response to receipt of a notification from an affected survivable gatekeeper 120 that it has become active, determines, by mapping the survivable gatekeeper's identifier 500 to the second set of data structures 450 in FIG. 5, the identifier of the affected network region(s) and disables the network region(s) assigned, by the first set of data structures 404 in FIG. 4, to the active survivable gatekeeper. This effectively unregisters, from the primary server, any gateways and endpoints assigned to the disabled network region and prevents new registrations with the primary server. If the disablement is done quickly enough, the transition points of the endpoints will not occur until after network region disablement and thereby prevent split registration by endpoints. However, even if the disablement takes a longer interval and some endpoints do register with the primary server, once the disablement does occur, those endpoints will be forced from the primary server and will register with the survivable gatekeeper.

Figure 3:
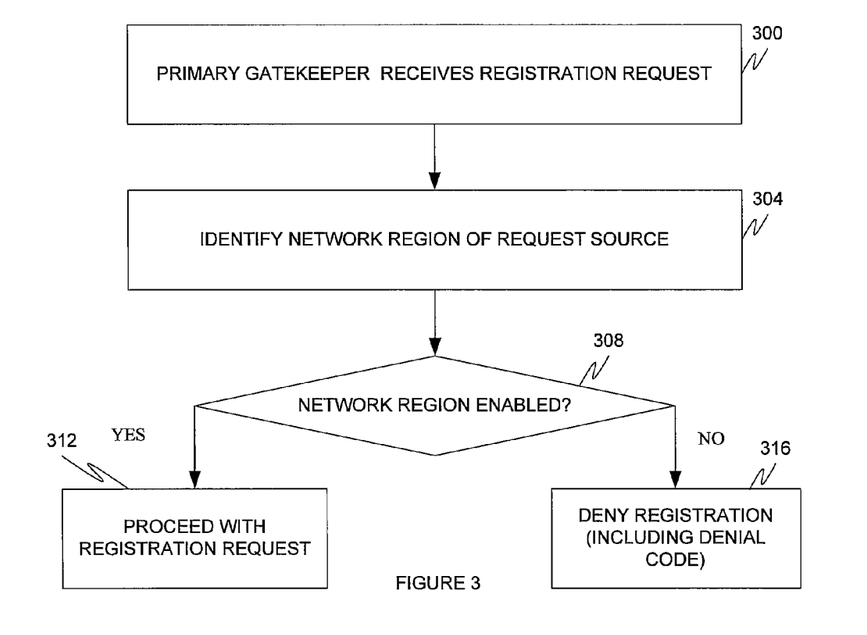
FIG. 3 is a flow chart depicting an operation of the system according to an embodiment.

FIG. 3 depicts the process for handling registration requests so that a registration negotiated with a component in a disabled network region is not confirmed.

In step 300, the primary gatekeeper 140 receives a registration request from a gateway or endpoint.

In step 304, the gatekeeper 140 identifies the network region identifier of the request source. This is typically done by mapping the identifier of the source to the second set of data structures 450 in FIG. 5.

In decision diamond 308, the gatekeeper 140 determines, from the first set of data structures in FIG. 4, whether the identified network region is enabled (has an inactive survivable gatekeeper) or disabled (has an active survivable gatekeeper).

When the network region is active, the gatekeeper 140, in step 312, proceeds with the registration request.

When the network region is not active, the gatekeeper 140, in step 316, denies the registration request, with the denial response message including a denial code indicating the reason for the denial. In one configuration, the denial code indicates to the request source that it is to go and register with its survivable gatekeeper.

In one configuration, the manager 144 deactivates a plurality of network regions in response to an indication that a survivable gatekeeper responsible for commonly all of these network regions has become active. In one embodiment, all of the network regions are disabled when only one of the several survivable gatekeepers assigned to those network regions becomes active. The assumption is that the other survivable gatekeepers will also or have already become active and may have been unable, due to a network malfunction, to notify the primary server 104 of the changed status.

Figure 6:
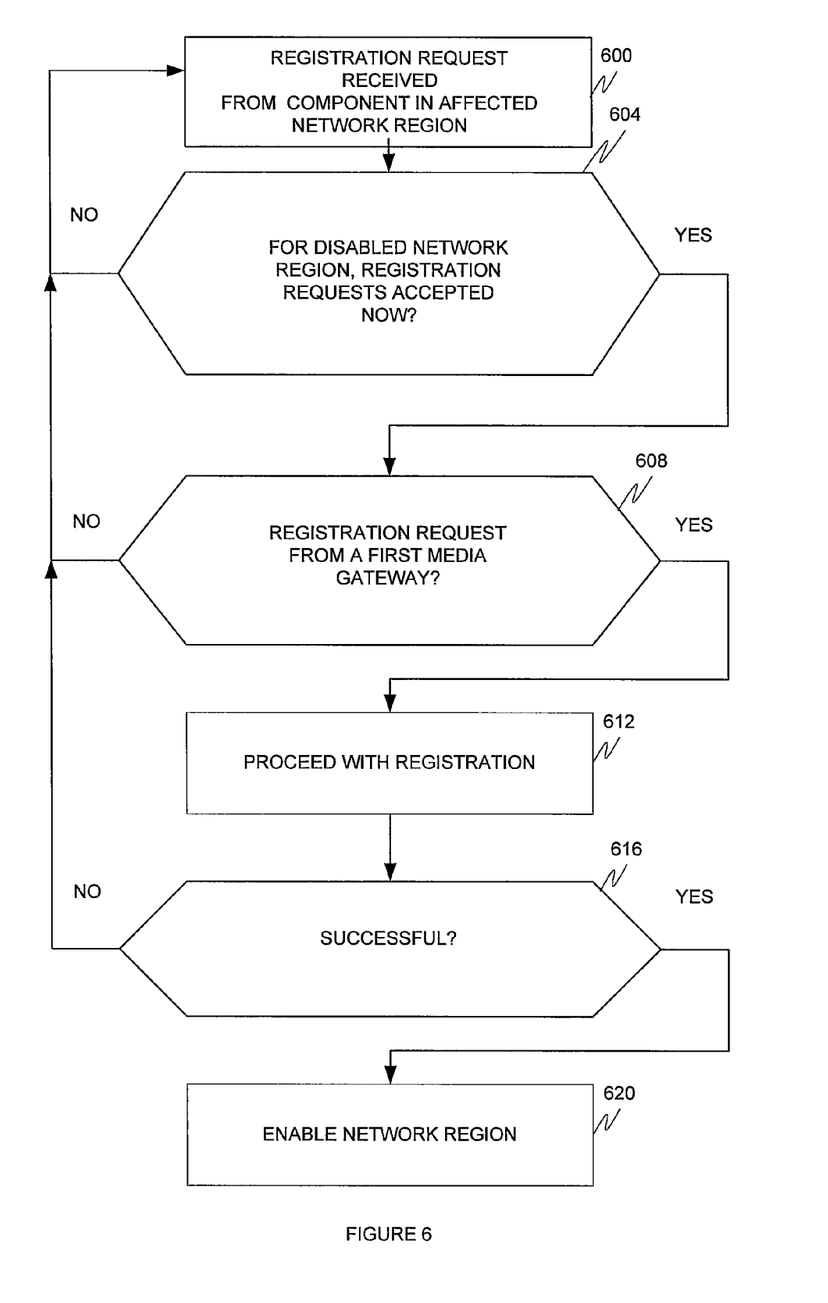
FIG. 6 is a flow chart depicting an operation of the system according to an embodiment.

The recovery process will now be described with reference to FIG. 6. FIG. 6 assumes that the malfunction has been resolved, thereby making it possible for components, namely media gateways and/or endpoints, in disabled network region(s) to register with the primary gatekeeper 140 in the server 104.

In step 600, the primary gatekeeper receives a registration request from a gateway or endpoint in the affected network region. There are many ways that the components registered with a survivable gatekeeper migrate back to the primary server. A first technique is as a result of a reset of the survivable gatekeeper. A second technique permits the component to register with the primary server as soon as communication is reestablished between the component and the primary server. This may be determined from restoration of a heartbeat mechanism. A third mechanism is time-of-day window, which permits a component to return to the primary server when the heartbeat mechanism is restored and the current time and date singly or collectively fall within a specified time-of-day range or day-of-week range. A fourth mechanism permits a component to return to the primary server when the heartbeat mechanism is restored and the component, particularly an endpoint, is currently not on a phone call. This mechanism is disfavored because it can result in further split registrations as a result of phones returning to the primary server at different times. It is preferred that the components in an affected network region migrate to the primary server at substantially the same time. In one configuration, this is effected by permitting all of the components in the affected network region to return to the primary server as a group rather than one-by-one. For example, the survivable gatekeeper can deregister all of the components from the affected network region substantially simultaneously. A fifth mechanism is execution of a manual command on the primary server to re-enable the network region. Other mechanisms may be employed as will be appreciated by those of skill in the art.

In decision diamond 604, the remote server manager 144 determines whether, for the disabled network region to which the request source, whether a gateway or endpoint, is assigned, registration requests are being accepted now. This determination is made using one or more of the mechanisms noted above.

If registrations are not being received, the primary gatekeeper 140 sends a response denying registration and including a denial code. The remote server manager 144 then returns to step 600 and awaits a next registration request.

If registrations are being received, the remote server manager 144, in decision diamond 608, determines whether the registration request source is a first media gateway associated with that network region. This is done using the source identifier (such as the gateway ID 504) in the request.

If the source is not a first media gateway, the manager 144 returns to step 600 and sends a response denying registration and including a denial code.

If the source is a first media gateway, the manager 144, in step 612, proceeds with the registration. In this step, other criteria are applied by the primary gatekeeper 140 to determine whether the registration request may be successfully processed. These added criteria will be known to those of ordinary skill in the art. As will be appreciated, it is generally desired that the media gateway(s) in a selected (formerly disabled) network region register before the endpoints in that (formerly disabled) network region.

In decision diamond 616, the manager 144 determines whether the registration was successful.

If the registration is not successful, the manager 144 returns to step 600.

If the registration is successful, the manager 144, in step 620, enables all of the network region(s) in the first set of data structures (FIG. 4) that are serviced by the survivable gatekeeper assigned to the media gateway's network region. Thus, not only the media gateway's network region but also all of the other network regions sharing a survivable gatekeeper with that network region are enabled. This is done regardless of whether the media gateways in the other network regions are otherwise permitted to register at the current time with the primary server 104. Enabling the network region(s) will effectively cause all of the components in the newly enabled network region(s) to unregister with the survivable gatekeeper and re-register with the primary gatekeeper.

The exemplary systems and methods of this disclosure have been described in relation to distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the primary gatekeeper could determine, on a case-by-case basis, whether media gateways and endpoints should be allowed to register to the gatekeeper. The gatekeeper does so based on its knowledge respecting the media gateways registered to it and information it learns from other gatekeepers. A primary gatekeeper could reject or unregister media gateways and endpoints using any suitable criteria, including without limitation whether another gatekeeper has at least one gateway registered in a certain logical or geographical area (if that is the case, it means that the survivable gatekeeper is active); another gatekeeper has more than half (or some other percentage) of gateways registered in a certain logical or geographical area; or another gatekeeper has gateways registered that control trunks covering a certain logical or geographical area. Possible methods of communicating this information to endpoints, gateways, and gatekeepers are: a registration reject message (advantageously this message tells the endpoint where to try next), a broadcast message to all endpoints and gateways, or a publication message from one gatekeeper to other gatekeepers indicating that a gateway or endpoint from a grouping of nodes, including the gateway or endpoint, has registered with it. The other gatekeepers would, in turn, tell the other endpoints and gateways when they try to register. When an endpoint is rejected by a gatekeeper that does not control an adequate amount of gateway resources, the endpoint will attempt to register to other gatekeepers in the endpoint's alternate gatekeeper list. Eventually, the endpoint will succeed in finding and registering to a gatekeeper that controls an adequate amount of the requisite gateways.

In another alternative embodiment, the concepts described herein apply to protocols other than H.323. Examples include the Session Initiation Protocol ("SIP") and the like.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the embodiments, configurations, and aspects are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the disclosed embodiments, configurations, and aspects after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claims require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) determining, by a primary gatekeeper, that a status of a survivable gatekeeper assigned to a selected network region has become active, wherein the determined status of the survivable gatekeeper changes from inactive to active in response to the primary gatekeeper determining that a gateway or a communications endpoint in the selected network region is registering with the survivable gatekeeper, wherein the primary gatekeeper receives notification that the survivable gatekeeper has become active, and wherein when the primary gatekeeper determines that the survivable gatekeeper is inactive no gateway or communications endpoint is registered with the survivable gatekeeper; and
   (b) in response to determining by the primary gatekeeper that the survivable gatekeeper has become active, at least one of: 1) unregistering, from the primary gatekeeper, at least one of a gateway or communications endpoint assigned to the selected network region; or 2) the primary gatekeeper preventing registration, with the primary gatekeeper, of the at least one of the gateway or communications endpoint.

2. The method of claim 1, wherein (b) comprises:
   (B1) disabling, by the primary gatekeeper, the selected network region, wherein, when the selected network region is disabled, a gateway or communications endpoint in the selected network region is prevented from registering with the primary gatekeeper.

3. The method of claim 1, wherein (b) comprises:
   (B1) disabling, by the primary gatekeeper, the selected network region, wherein, when the selected network region is disabled, a gateway or communications endpoint in the selected network region registered with the primary gatekeeper is, in response to the selected network region disablement, unregistered from the primary gatekeeper.

4. The method of claim 1, further comprising:
   (c) after (b), receiving, by the primary gatekeeper, a registration request from a gateway or endpoint in the selected network region;
   (d) determining, by the primary gatekeeper, that the gateway or endpoint is eligible to register with the primary gatekeeper;
   (e) registering successfully the gateway or endpoint; and
   (f) in response to (e), permitting, by the primary gatekeeper, other components in the selected network region to register with the primary gatekeeper.

5. The method of claim 4, wherein, before (f), the selected network region is disabled and wherein, in (f), the selected network region is enabled by the primary gatekeeper.

6. A primary gatekeeper, comprising:
   an interface that communicates, via a network, with a survivable gatekeeper, gateway, and communications endpoint; and
   a processor programmed to:
   (i) determine that a status of the survivable gatekeeper assigned to a selected network region has become active in response to receiving a notification from the survivable gatekeeper that the survivable gatekeeper has become active, wherein the processor determines that the status of the survivable gatekeeper has changed from inactive to active in response to the gateway or the communications endpoint in the selected network region registering with the survivable gatekeeper, and wherein the processor determines that the survivable gatekeeper is inactive in response to no gateway or communications endpoint being registered with the survivable gatekeeper; and
   (ii) in response, at least one of (A) force the gateway or communications endpoint assigned to the selected network region to unregister with the primary gatekeeper or (B) deny registration, with the primary gatekeeper, of the gateway and/or communications endpoint.

7. The gatekeeper of claim 6, wherein (ii):
   disable, by the processor, the selected network region, wherein, when the selected network region is disabled, a gateway or communications endpoint in the selected network region is prevented from registering with the primary gatekeeper.

8. The gatekeeper of claim 6, wherein (ii) comprises:
   disable, by the processor, the selected network region, wherein, when the selected network region is disabled, a gateway or communications endpoint in the selected network region registered with the primary gatekeeper is, in response to the selected network region disablement, unregistered from the primary gatekeeper.

9. The gatekeeper of claim 6, wherein the processor is further programmed to:
   (iii) after (ii), receive a registration request from a gateway or endpoint in the selected network region;
   (iv) determine that the gateway or endpoint is eligible to register with the primary gatekeeper;
   (v) register successfully the gateway or endpoint; and
   (vi) in response to (v), permit other components in the selected network region to register with the primary gatekeeper.

10. The gatekeeper of claim 9, wherein, before (iii), the selected network region is disabled and wherein, in (vi), the selected network region is enabled by the primary gatekeeper.

11. A survivable gatekeeper, comprising: an interface that communicates, via a network, with a primary gatekeeper, gateway, and communications endpoint, the gateway and communications endpoint being in a selected network region; and
   a processor programmed to: transition from an inactive state to an active state, wherein, in the active state, the processor registers the gateway or communications endpoint in the selected network region, wherein the processor changes the state from the inactive state to the active state in response to the processor registering successfully the gateway or the communications endpoint in the selected network region and wherein, when the processor is in the inactive state, the processor does not register the gateway or communications endpoint in the selected network region; and notify a primary gatekeeper that the processor is now in the active state to cause the primary gatekeeper to unregister or deny registration of a gateway or communications endpoint in the selected network region.

12. The survivable gatekeeper of claim 11, wherein the processor, when in the active state, performs address translation, call admission control, bandwidth control, or zone management with respect to one or more communications endpoints in the selected network region, wherein when the processor is in the active state, a gateway or communications endpoint in the selected network region is unable to register with the primary gatekeeper.

13. The survivable gatekeeper of claim 11, wherein the processor, when in the active state, performs address translation, call admission control, bandwidth control, or zone management with respect to one or more communications endpoints in the selected network region, wherein the primary gatekeeper disables the selected network region, wherein, when the processor being in the active state, causes a gateway or communications endpoint in the selected network region to unregister from the primary gatekeeper.

14. The survivable gatekeeper of claim 11, wherein the processor later causes the processor to transition from being in the active state to the inactive state and, in response, unregisters a gateway in the selected network region to cause the unregistered gateway to register with the primary gatekeeper.

15. The survivable gatekeeper of claim 14, wherein the selected network region is disabled before other components in the selected network region register with the primary gatekeeper and wherein the selected network region is enabled when the formerly unregistered gateway registers successfully with the primary gatekeeper.

16. The method of claim 1, wherein the survivable gatekeeper, when active, performs address translation, call admission control, bandwidth control, or zone management with respect to one or more communications endpoints in the selected network region and, when inactive, performs no address translation, call admission control, bandwidth control, or zone management with respect to one or more communications endpoints in the selected network region.

17. The primary gatekeeper of claim 6, wherein the survivable gatekeeper, when active, performs address translation, call admission control, bandwidth control, or zone management with respect to one or more communications endpoints in the selected network region and, when inactive, performs no address translation, call admission control, bandwidth control, or zone management with respect to one or more communications endpoints in the selected network region.

18. The survivable gatekeeper of claim 11, wherein the processor, when in the active state, performs address translation, call admission control, bandwidth control, or zone management with respect to one or more communications endpoints in the selected network region and, when the processor is in the inactive state, performs no address translation, call admission control, bandwidth control, or zone management with respect to one or more communications endpoints in the selected network region.

19. The method of claim 1, wherein the gateway comprises an alternate gatekeeper list containing a listing of primary, alternate, and survivable gatekeepers in the order in which the gateway is to attempt registration and wherein, at a transition point, the gateway, if still unregistered with a primary or alternate gatekeeper, attempts to register with a listed survivable gatekeeper.

20. The primary gatekeeper of claim 6, wherein the gateway comprises an alternate gatekeeper list containing a listing of primary, alternate, and survivable gatekeepers in the order in which the gateway is to attempt registration and wherein, at a transition point, the gateway, if still unregistered with a primary or alternate gatekeeper, attempts to register with a listed survivable gatekeeper.

* * * * *

UNITED STATES PATENT AND TRADEMARK OFFICE
CERTIFICATE OF CORRECTION

PATENT NO.         : 9,438,636 B2
APPLICATION NO.    : 12/560144
DATED              : September 6, 2016
INVENTOR(S)        : Charles Farwell et al.

It is certified that error appears in the above-identified patent and that said Letters Patent is hereby corrected as shown below:

In the Claims

At Column 12, Line 23, please delete "and/" therein.

Signed and Sealed this
Thirty-first Day of January, 2017

Michelle K. Lee
*Director of the United States Patent and Trademark Office*